Figure 1:
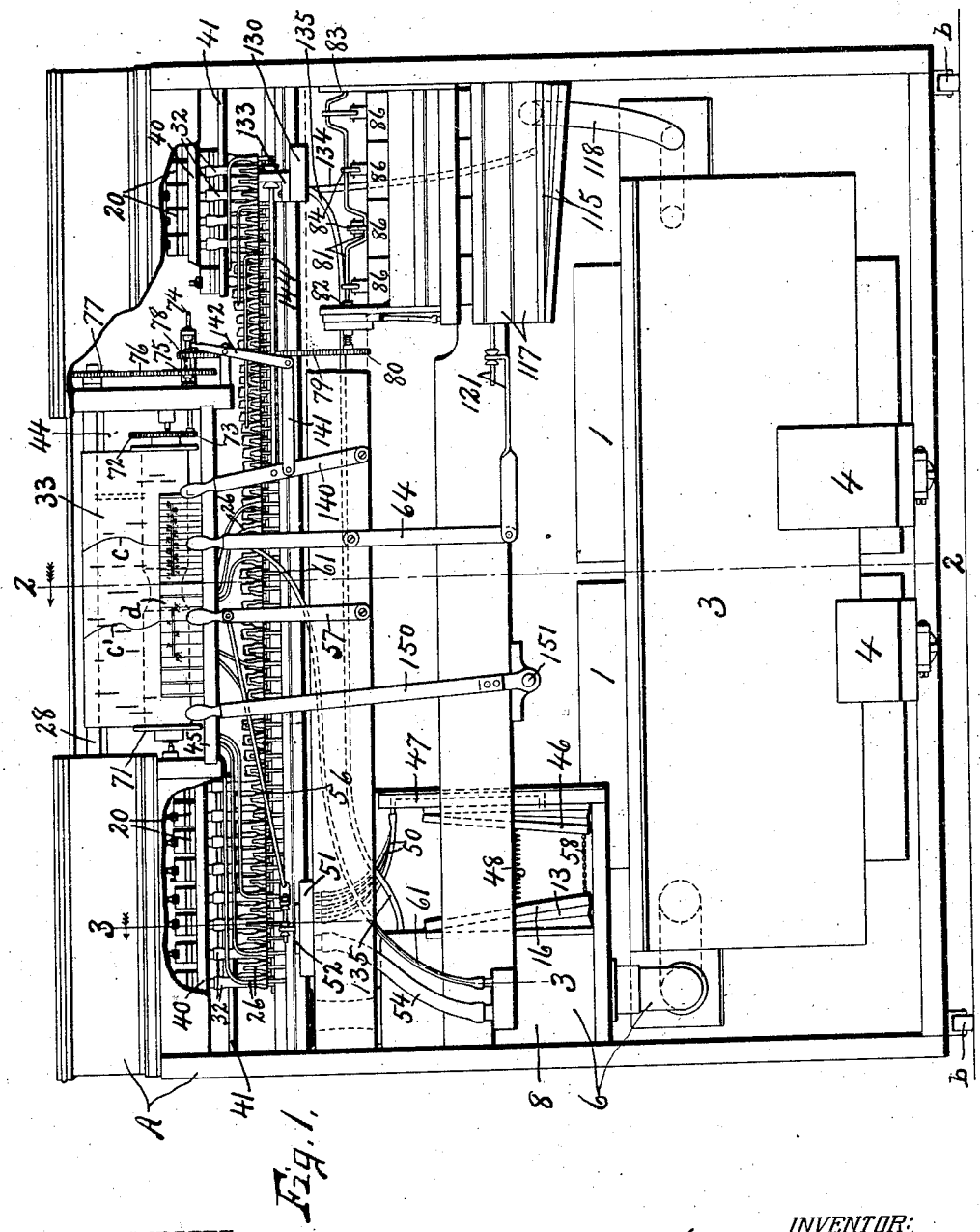

L. B. DOMAN.
PNEUMATIC SELF PLAYING MUSICAL INSTRUMENT.
APPLICATION FILED MAR. 9, 1905.

1,097,706.

Patented May 26, 1914.
6 SHEETS—SHEET 1.

WITNESSES:
B. E. Ritmen.
A. D. Allen

INVENTOR:
Lewis B. Doman
BY:
Howard P. Denison
ATTORNEY

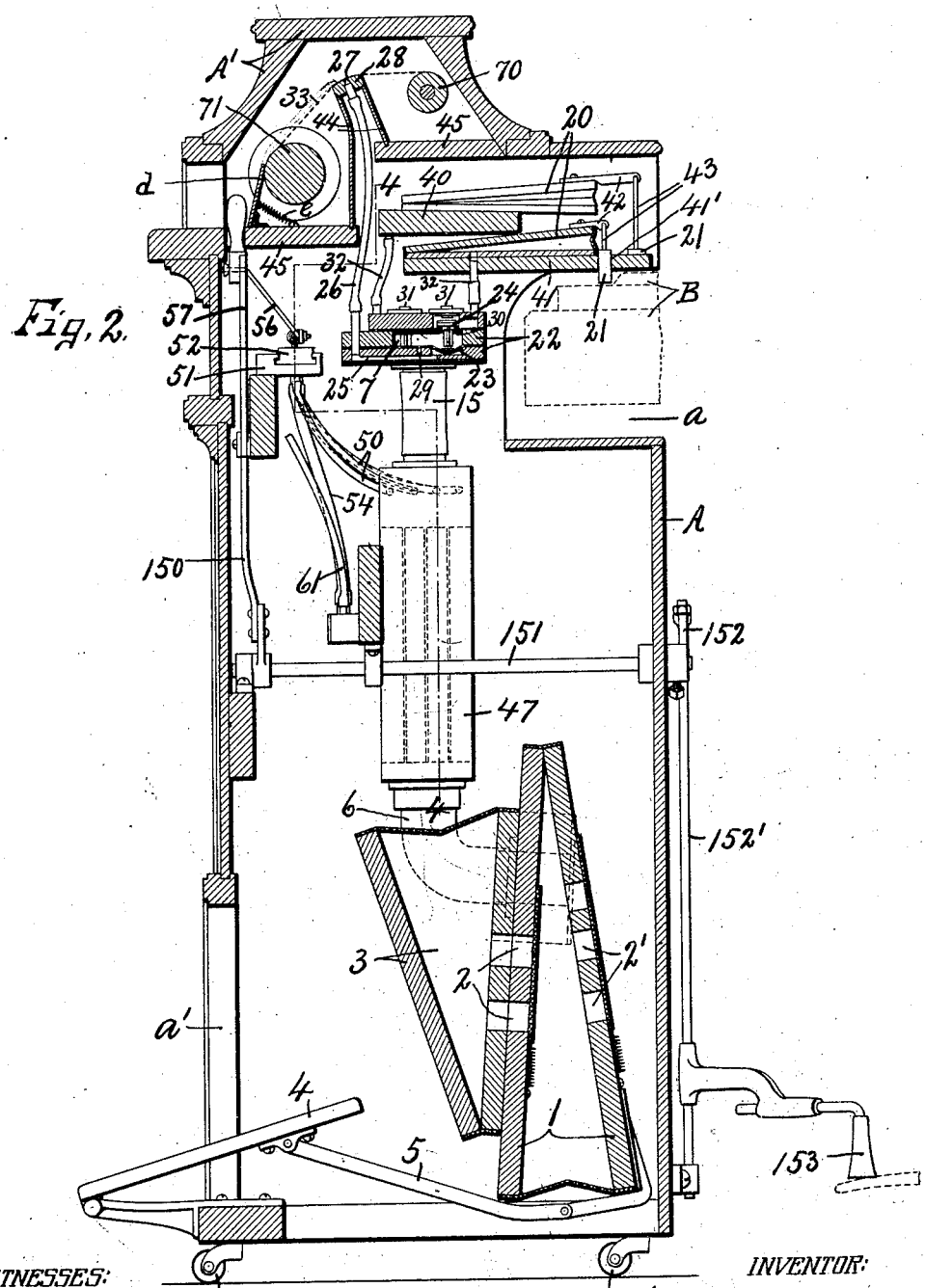

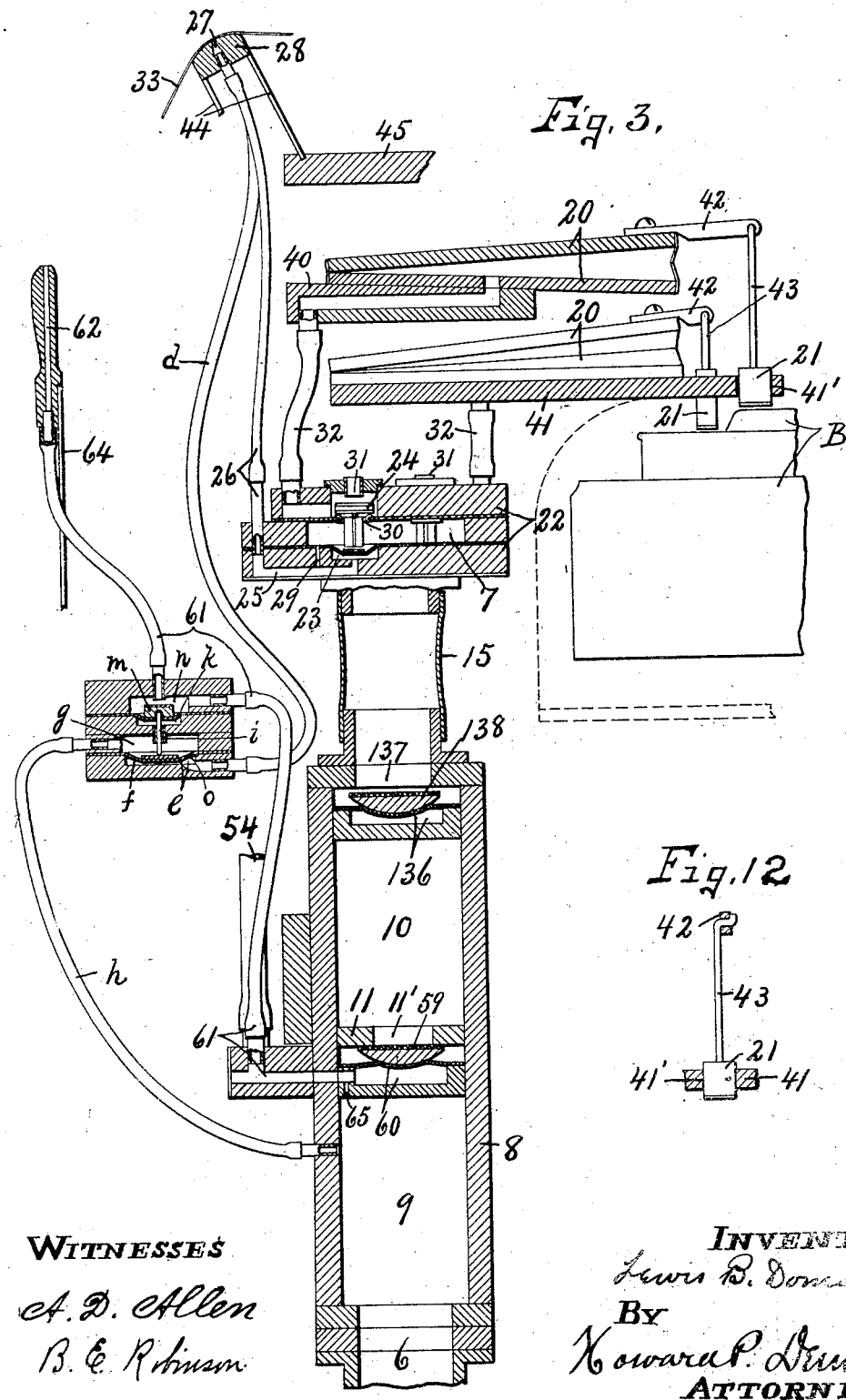

L. B. DOMAN.
PNEUMATIC SELF PLAYING MUSICAL INSTRUMENT.
APPLICATION FILED MAR. 9, 1905.
1,097,706.
Patented May 26, 1914.
6 SHEETS—SHEET 4.
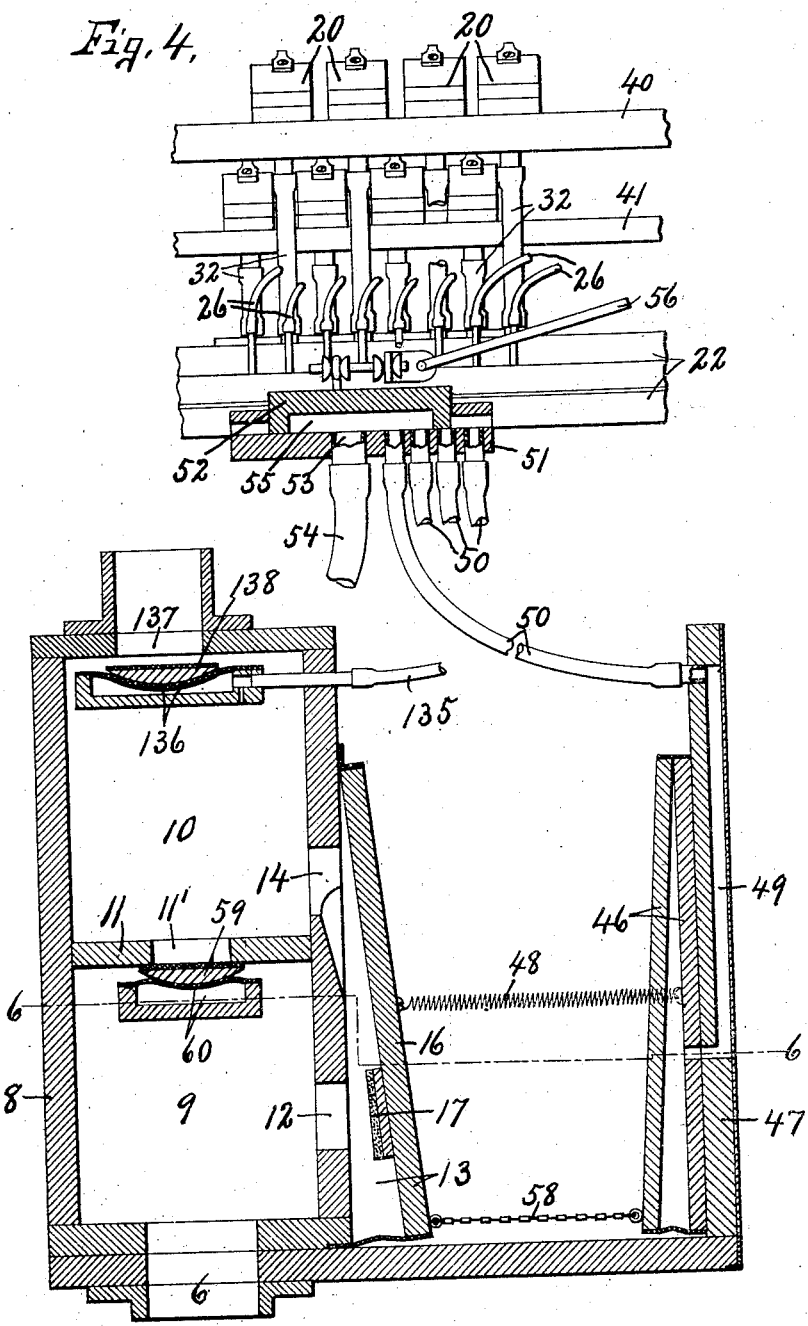

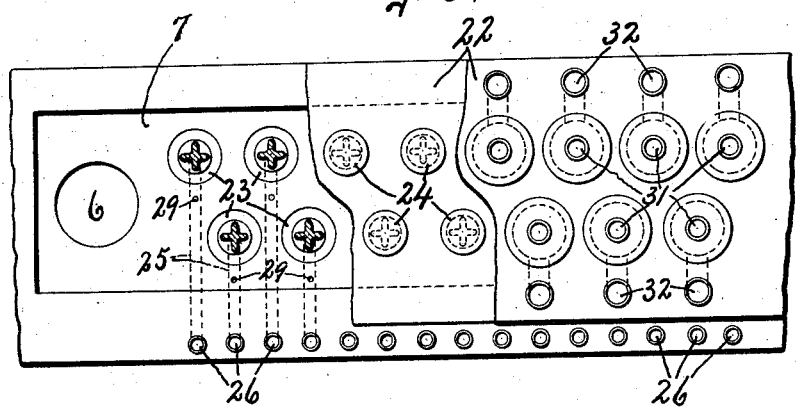
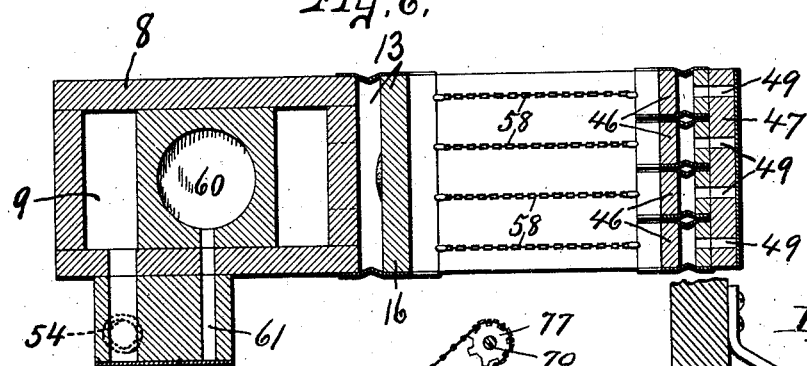
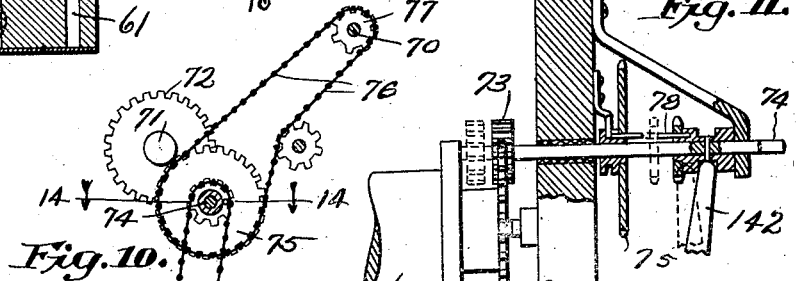

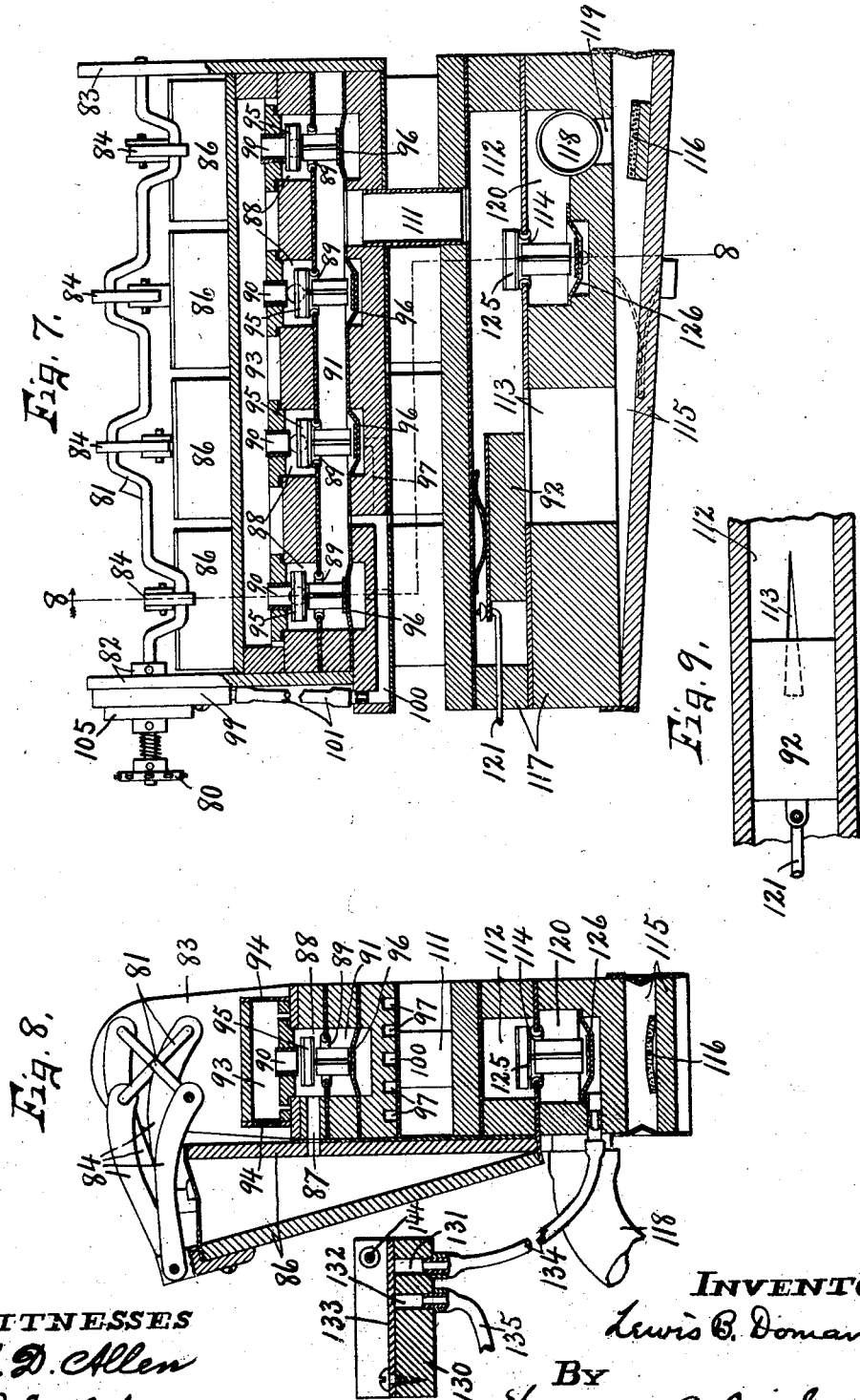

UNITED STATES PATENT OFFICE.

LEWIS B. DOMAN, OF ELBRIDGE, NEW YORK, ASSIGNOR TO AMPHION PIANO PLAYER COMPANY, OF ELBRIDGE, NEW YORK, A CORPORATION OF NEW YORK.

PNEUMATIC SELF-PLAYING MUSICAL INSTRUMENT.

1,097,706.　　　　Specification of Letters Patent.　　Patented May 26, 1914.

Application filed March 9, 1905. Serial No. 249,250.

*To all whom it may concern:*

Be it known that I, LEWIS B. DOMAN, of Elbridge, in the county of Onondaga, in the State of New York, have invented new and useful Improvements in Pneumatic Self-Playing Musical Instruments, of which the following, taken in connection with the accompanying drawings, is a full, clear, and exact description.

This invention relates to improvements in pneumatic self-playing musical instruments, and refers more particularly to the general structure of a pneumatic piano player in which the various specific elements, hereinafter described, contribute to render the operation comparatively simple and easy without material loss of power, and to enable the operator to produce an accurate rendition of any musical selection, either in accordance with the intention of the composer, or with the wishes of the operator.

The primary object is to combine the several pneumatic-actions in such compact manner as to bring the several elements into close relation, whereby the inclosing case may be made to occupy a comparatively small space in front and above the key-board of the piano by assembling all of the primary pneumatics and their individual valves in a single valve-shelf and superposing the key-striking pneumatics directly above said valve-chest, and key-board of the piano.

Another object is to flexibly connect the key-striking pneumatics to the valve-chest so as to obviate any liability of leakage, as distinguished from the rigid mounting of such pneumatics upon the valve-chest, in which case, the joints are always more or less liable to leak by reason of the unequal shrinkage of the parts.

Another object is to interpose an expression-controlling-pneumatic between the exhaust device and key-action, and to provide for the step-by-step gradation of expression by mechanically connecting said pneumatic with a series of smaller pneumatics, one or more of which may be placed in communication with the exhaust device at the will of the operator to add more or less resistance to the action of the main expression controlling pneumatics.

A further object is to provide a direct air-passage between the exhaust-device and key-action with a pneumatic valve which is normally closed by atmospheric pressure and is automatically opened by closing its communication with atmosphere, thereby allowing the valve to open to throw the full force of the exhaust into the key-striking pneumatic to accent any individual note or chord which may be desired.

The foregoing objects relate more particularly to the key-action and its controlling mechanisms including the step-by-step gradation of expression or force from $ff$ to $pp$ and vice versa, and also the means for accentuating individual notes or chords.

The feed of the music-sheet is controlled by a suitable pneumatic motor, and one of the objects in this connection is to enable the operator to control the tempo or speed of the feed of the music-sheet by varying the capacity of some part of the conduit leading from the exhaust device to the motor pneumatics and to thereby govern the action of an auxiliary-valve-pneumatic which is connected in and forms a part of such conduit to further regulate the action of the motor-pneumatics.

A still further object is to provide means under the control of the operator to reverse the feed of the music-sheet and simultaneously cut out the key action and tempo-controlling pneumatic from the exhausting device for the purpose of establishing direct communication between the exhaust device and motor pneumatics and thereby increasing the power and speed of action in rewinding the music-sheet.

Other more specific objects relating both to the pneumatic-key-action and to the pneumatic-motor-action will be brought out in the following description.

In the drawings—Figure 1 is a front elevation of my improved pneumatic piano-player, the greater part of the front wall of the inclosing-case being broken away to disclose the interior mechanism. Fig. 2 is a transverse vertical sectional view taken on line 2—2, Fig. 1. Fig. 3 is an enlarged transverse vertical sectional view taken on line 3—3, Fig. 1, except that I have shown the tracker-board as connected to the valve-chest, the purpose of this view being to better illustrate the pneumatic key-action and its controlling mechanism, including its connection with the main exhausting device. Fig. 4 is an enlarged sectional view taken on line 4—4, Fig. 2, showing a portion of the valve-chest and key-striking pneumatics in front elevation, but the main purpose is to illustrate the expression controlling mechanism and main exhaust conduit leading to the key-action. Fig. 5 is an enlarged top plan of a portion of the valve-chest, portions thereof being broken away to disclose the underlying mechanisms and primary pneumatics. Fig. 6 is a horizontal sectional view taken on line 6—6, Fig. 4, showing the relative arrangement of the main exhaust conduit; expression-controlling pneumatic and its auxiliary governing pneumatics. Fig. 7 is a front elevation, partly in section, of the pneumatic motor action and its controlling mechanisms, including the main governing pneumatic and primary pneumatics which are shown in section. Fig. 8 is a sectional view taken on line 8—8, Fig. 7. Fig. 9 is a top plan of a portion of a shelf —17— showing the upper opening —113— and a portion of its valve 120. Fig. 10 is an end view of the driving-gear for the winding and rewinding rollers of the music-sheet, as seen in front elevation in Fig. 1. Fig. 11 is a sectional view taken on line 11—11, Fig. 10. Fig. 12 is an enlarged sectional view of the connection between one of the key-striking pneumatics and its plunger rod.

This piano-player comprises essentially a suitable air exhausting device, such as one or more bellows and an equalizing chamber; second, a key-action and its controlling elements, including a perforated music-sheet, and third, a driving mechanism for the music-sheet; a series of motor pneumatics and their controlling devices, all as hereinafter more fully described. These several actions are incorporated compactly within a suitable case —A— having a hinged top —A'— to permit access to, and to cover the music-sheet, and is also provided in its rear side with a recess —a— for receiving a portion of the piano-key-board, as —B—; the front of the case toward the operator being provided with a suitable pedal-opening —a'—, and the whole case being mounted upon suitable casters or rollers —b— which may be made adjustable, if desired, to vary the height of the player to adapt it to various heights of key-boards.

The main air-exhausting-device preferably consists of a pair of bellows —1— which are connected by passages —2— directly to an equalizing chamber, as a bellows —3—, and are operated by suitable pedals —4— through the medium of links —5—, the pedals —4— being hinged at their front ends to play in the pedal-openings —a'—. It will be observed that the movable wall of the bellows —1— is also provided with one or more apertures —2'— opening to atmosphere, the passages —2— and —2'— being provided with suitable valves for permitting the entrance and exit of air to and from the bellows —1— and equalizing chamber —3—, the pedals —4— being connected in such manner as to expand the bellows —1— by their downward movement, at which time, the air is exhausted from the equalizing chamber —3—. This equalizing chamber —3— is connected by a conduit —6— to an exhaust-chamber —7— of the pneumatic key-action, the conduit —6— including an upright exhaust-chest —8— having lower and upper chambers —9— and —10— which are separated by a transverse partition —11—, the lower chamber —9— being connected directly to the equalizing chamber —3—, and is provided with a lateral passage —12— in one of its sides communicating with a governing pneumatic —13—. The chamber —10— also communicates with the pneumatic —13— through a passage —14— and is connected at its upper end by a conduit —15— directly to the exhaust-chamber —7— in the valve-shelf. The governing pneumatic —13— is attached to one side of the air-chest —8— having the openings —12— and —14— and serves to connect the chamber —9— with the chamber —10—. This governing pneumatic —13— is provided with a movable wall —16— carrying a felt or other porous valve —17— which is adapted to cover the opening —12— when the governing pneumatic —13— is deflated. Under such conditions the force of the air passing through the passage —12— is materially reduced or subdued, but even when the opening —12— is entirely covered by the valve —17— the porosity of the latter enables the air to sift slowly and noiselessly from the chamber —10— to the chamber —9— in order to maintain at all times, more or less vacuum in the chamber —7— for the purpose of operating the key-striking pneumatics with greater or less force, according to the position of the valve —17— with reference to the opening —12—. The governing pneumatic —13— forms a part of the expression controlling device, and is, therefore, a part of the controlling mechanism for the key-action, as hereinafter more fully described.

The key-action proper consists of a series of key striking pneumatics —20— which are arranged in decks one above the other to overhang the key-board —B—, those of one deck being arranged in staggered relation with those of the other deck with the movable side at the top, and are each provided with a depending key-striking plunger —21—, of special construction hereinafter described. The key-striking pneumatics —20— for the heavier bass-note keys of the piano are gradually reduced in capacity, that is, the areas of the movable sides of the key-striking pneumatics for the bass keys of the piano are gradually reduced from right to left, the object of this being to gradually subdue the force of action of these pneumatics as the volume of the tone of the key increases, so that the bass tones will not appear too prominent, or sufficiently so to obscure the higher tones.

The exhaust-chamber —7— is formed in a suitable valve-shelf —22— which contains a plurality of groups of primary pneumatics —23— and a corresponding number of groups of valves —24—, one for each primary and its corresponding key-striking pneumatics 20, the exhaust-chamber —7— being common to all of the valves of each group. Each primary pneumatic is connected by a conduit —25— to a duct —26— which leads to one of the ducts or vents —27— of a tracker-bar —28—, each of said primary pneumatics being also connected by comparatively small passage —29— to the exhaust-chamber —7—. Each of the valves —24— plays between two ports —30— and —31—, the port —30— communicating with the exhaust chamber —7— and also with one of the key striking pneumatics —20— by means of a conduit —32—, while the port —31— opens to atmosphere. The valves —24— are each provided with a depending stem which is guided in the port —30— and has its lower end lying in close proximity to, but slightly separated from the diaphragm of the primary pneumatic —23—. These valves —24— are normally closed when the air vents —27— in the tracker-bar —28— are closed, but as soon as a perforation in the music-sheet, as —33—, is registered with one of the air ducts or vents —27—, the corresponding primary pneumatic —23— is immediately inflated by the inrush of atmospheric air, thereby elevating its valve —24— and connecting the exhaust-chamber —7— with one of the key-striking-pneumatics —20—, thereby suddenly deflating said key-striking-pneumatic and causing its plunger —21— to operate or depress its corresponding piano-key. As soon as the vent —27—, which was previously opened, has been closed, the dead air in the pneumatic —23— is immediately exhausted through the restricted passage —29—, thereby allowing the valve —24— to close the port —30— and open the port —31— to admit atmospheric air into the duct —32—, and thence into the key-striking-pneumatic —20— for inflating the latter. In like manner, each of the key-striking pneumatics is operated when its corresponding tracker-duct —27— is opened, it being understood that each key-striking pneumatic is controlled by an individual valve —24— and its corresponding primary pneumatic —23—.

It will be observed that all of the primary pneumatics —23— and valves —24— are mounted in a single valve-shelf —22—, and in order to accomplish this arrangement, a series of primary pneumatics —23— and their valves —24— are grouped in line lengthwise of the shelf —22— and are so connected to the key-striking pneumatic of one deck, while another group of primary pneumatics —23— and their valves —24— are disposed in another longitudinal plane or line and are connected to the key-striking-pneumatics of the other deck, the primary pneumatics and their valves of one group being arranged in staggered relation to those of the other group, as best seen in Fig. 5. The upper and lower decks of the key-striking pneumatics are mounted upon lengthwise bars or supports —40— and —41— respectively, and are flexibly connected by the conduits —32— to the valve-chest —22—.

The key-operating plungers —21— are guided in openings —41'— in the lower bar —41—, the plungers for the black keys, which are narrowest, being of greater diameter than the plungers for the white keys, while the plungers for the white keys are of less diameter than the width of said white keys, the object of this being to permit a slight longitudinal adjustment of the piano-player to conform to different keyboards without liability of displacing the key-striking plungers from alinement with their proper keys.

The movable sides of the key-striking-pneumatics are provided with projecting fingers —42— having apertures in their outer ends for receiving the stems or connecting rods —43— of the plungers —21—, said rods having their upper ends offset or bent laterally and then upwardly through the apertured ends of the arms —42— and are therefore connected to their respective arms without the use of threaded stems or nuts and allow the parts to be easily and quickly assembled or taken apart.

The tracker —28— consists of a solid metal bar having a series of vent openings —27— formed therein, the inner ends of the openings being drilled or bored part way through toward the outer surface and the remaining portions are punched out by suitable dies so as to form apertures which are elongated transversely of the music-sheet, or longitudinally of the tracker to about the diameter of the inner bore, but are comparatively narrow transversely of the tracker, or in the direction of movement of the music-sheet. The object of forming this tracker from a solid piece of metal is to obviate the usual joints, which are always more or less liable to leak. Furthermore, this tracker may be produced at a minimum cost by reason of the fact that the labor and material necessary in securing sections of the sectional tracker together are avoided. This tracker may be held in place by suitable plates —44— which are supported upon shelves —45— which form a part of the case, the plates —44— serving to conceal and protect the upper portions of ducts —26— which would otherwise be exposed. It is now clear that a partial vacuum is maintained in the chamber —7— and that as often as a perforation in the music-sheet —33— is registered with one of the vents —27—, of the tracker, the corresponding primary pneumatic —23— is inflated to operate its valve —24—, thereby closing the port —31— to atmosphere and opening the port —30— so as to connect the exhaust-chamber —7— directly with the key-operating pneumatic —20— corresponding to the open valve —24— and its primary pneumatic —23—, which causes the instantaneous collapse of said key-striking-pneumatic to operate its plunger —21—, whereby the piano-key is operated with more or less force, according to the position of the valve —17— with reference to the port —12— of the expression controlling mechanism.

I will now proceed to describe the expression controlling mechanism, whereby step-by-step gradation of expression may be produced.

It is clear from the foregoing description that a partial vacuum is maintained in the main governing pneumatic —13— which tends to bring the valve —17— into position to cover the port —12—, and in order to regulate the degree of movement of the valve —17—, I provide a series of, in this instance four, smaller pneumatics —46—, which are mounted upon a suitable support —47— forming a part of the case and have their movable sides facing the movable side —16— of the main governing pneumatic —13—. The combined areas of these smaller pneumatics —46—, or rather of their movable sides, which are exposed to atmospheric pressure, is substantially equal to the similar area of the side —16— of the main governing pneumatic —13— so that when all of the pneumatics —46— are inflated or out of connection with the exhaust device, the main governing pneumatic —13— has a greater tendency to bring the valve —17— into position to cover the port —12—, but this tendency is counter-acted to a certain degree by a spring —48—, Fig. 4, which is so adjusted as to allow the movable valve —17— to cover the port —12— with a light pressure for producing a pianissimo effect, it being understood that the valve —17— is finely porous to allow the air to sift therethrough even when covering the port. Each of these smaller pneumatics —46— is connected by a duct —49— to a flexible conduit —50— and these conduits are connected to suitable ports in a valve-board —51— upon which is movable a slide valve —52—. This valve-board is also provided with an exhaust-port —53— which is connected by a flexible conduit —54— to the exhaust chamber —9—, this connection being best illustrated in Figs. 1, 2, 3 and 6. The slide valve —52— has a chamber —55— which communicates with the exhaust-port —53— and is adapted to be connected to one or more of the ports of the conduits —50— which lead to the pneumatics —46—, said slide valve being connected by a link —56— to a lever —57— which has an exposed hand-piece within convenient reaching distance of the operator, as best seen in Fig. 1, so that by simply rocking this lever backward or forward the chamber —55— may be brought into registration with one or all of the ports of the conduits —50— which connect them to the exhaust conduit 54.

In Fig. 4 I have shown the slide valve —52— in position to connect two of the pneumatics —46— to the exhaust-conduit —54—, and therefore, these two pneumatics are deflated and offer a certain resistance to the collapse of the pneumatic —13—; each of said pneumatics —46— being connected by a separate flexible connection —58— to the movable side —16— of the governing pneumatic —13—. It is now clear that when the slide valve —52— is moved to the left, Fig. 4, so as to uncover all of the ports of the conduits —50—, which normally open to atmosphere, the pneumatics —46— will be inflated and the valve —17— will be free to cover the port —12— to produce the softest or pianissimo expression. Now, assuming that the valve is moved to connect one of the pneumatics —46— with the exhaust conduit —54—, then a certain degree of resistance to the collapse of the main governing pneumatic —13— is introduced by reason of the partial vacuum in the pneumatic —46— which may be in communication with the exhausting device, thus causing the striking pneumatics to operate with a slightly greater degree of force for "piano" expression. In like manner, if two of the pneumatics —46— are connected to the exhausting device the key-striking pneumatic will be operated with still greater force, representing the third degree, or *mf* expression, and so on if three pneumatics —46— are placed in communication with the exhausting device by the further movement of the slide valve —52— the key-striking-pneumatics will be operated with still greater force to give a "forte" expression, and if the fourth pneumatic —46— is brought into communication with the exhausting device, the key-striking pneumatics will be operated with full "fortissimo" effect. It is now apparent that the sliding of the valve —52— in one direction produces a gradual step-by-step expression from *pp.* to *ff.* and by sliding it in the opposite direction, a step-by-step gradation of expression from *ff.* to *pp.* may be produced.

It is sometimes desirable to accentuate individual notes or chords during the rendition of a musical selection and for this purpose I provide the partition —11—, Figs. 3 and 4, with a port —11'— which forms a direct communication between the chambers —9— and —10— of the air-chest —8—, and this port is provided with a normally closed valve —59— which is seated upon the diaphragm of a normally inflated pneumatic —60—, as best seen in Fig. 3. This pneumatic —60— is connected by a conduit —61— to a port —62— which normally opens to atmosphere, and is preferably formed in the hand-piece of a tempo-controlling lever, as —64—, although this port —62 may be formed in any movable or fixed support within easy reaching distance of the operator. The valve —59— is maintained in this closed position by atmospheric pressure in the pneumatic —60— as long as the port —62— is opened to atmosphere, and therefore, the exhaust chambers —9— and —10— are normally connected through the medium of the governing pneumatic —13— only. Now, assuming that the governing pneumatic —13— is adjusted through the medium of the lever —57—; valve 52, and pneumatics —46— to produce a certain pressure, softer than fortissimo—then, if it is desired to accentuate any note or chord with full fortissimo force, during the playing of the selection, the operator simply closes the port —62— with the finger, whereupon the air in the pneumatic —60— is immediately exhausted through a comparatively small passage —65— leading from the pneumatic —60— to the exhaust-chamber —9—. This deflation of the pneumatic —60— allows the valve —59— to open the port —11'—, thereby establishing direct communication between the exhaust-chambers —9— and —10—, through said port —11'—, and also establishing direct communication between the main exhausting device and key-striking pneumatics to operate the latter with full force, even though the valve —17— may be partially closed. This direct communication between the exhausting device and key-striking pneumatics will be maintained as long as the port —62— is closed, but as soon as the finger is removed to open the port, the inrush of atmospheric air into the pneumatic —60— will immediately inflate the latter and close the valve —59— and port —11'—, thereby restoring the normal expression, as controlled by the valve —17—.

I have thus far described the pneumatic-key-action and its controlling devices including the means for regulating the step-by-step gradation of expression and also the means for accentuating any individual note or chord during the rendition of the selection, and I will now proceed to describe the means for winding and rewinding the music-sheet, by which the "tempo" is determined.

The music-sheet —33— is supplied upon a suitable roller —70— which is adapted to be inserted in suitable bearings in the upper end of the case —A— at the rear of the tracker —28— and its free end is drawn forwardly over the tracker and is suitably attached to the periphery of a take up roller —71— which is located in front of and in a plane beneath the tracker —28—. The roller —70— from which the music-sheet is unwound, and upon which it is again re-wound is removable to permit different music-rolls to be inserted, but the winding roller —71— is permanently journaled in the case and may be provided with any suitable means to which the advance end of the music-sheet may be detachably connected so as to automatically release on the rewind. As best seen in Fig. 1, the roller —71— is provided with a gear —72— which meshes with a pinion —73— on a shaft —74—. Loosely mounted upon the shaft is a sprocket-wheel —75— which is connected by a chain —76— to a smaller sprocket-wheel —77— on the spindle of the rewind roller —70—. The shaft —74—is movable endwise sufficient to throw the pinion —73— out of mesh with the gear —72— and is provided with a clutch-section —78— which is secured to the shaft —74— and is adapted to interlock with a similar clutch section on the face of the sprocket —75—, whereby when the pinion —73— is out of mesh with the gear —72— the shaft —74— is locked to and operates to rewind the music-sheet with considerably greater speed than when wound upon the roller —71— by reason of the fact that the sprocket-wheel —77— is very much smaller than the sprocket-wheel —75—. The clutch-member —78— is preferably made in the form of a sprocket-wheel and is connected by a chain or belt —79— to a sprocket-wheel —80— on a crank-shaft —81—. This crank-shaft —81— is journaled at its ends in suitable bearings —82— and —83— and is provided with a series of, in this instance four, crank-arms each being arranged a quarter of a turn in advance of the other and each crank is connected by a link —84— to the movable side of a motor pneumatic —86—. It now appears that there are four motor-pneumatics, one for each crank-arm, said pneumatics being successively brought into action for transmitting motion to the crank-shaft —81—.

The exhaust-chamber —91— is connected by a conduit —111— to a valve chamber —112— having two ports —113— and —114—, the port —113— being tapered longitudinally and opens into a governing pneumatic —115— having its movable side provided with a felt or other porous-valve —116—. The ports —113— and —114— are formed in the lower wall of the valve-chest —117—, to which the governing pneumatic —115— is secured. This valve-chest is connected by a conduit —118— to the equalizing chamber —3— of the main-exhausting device, and also communicates with the interior of the governing pneumatic —115— through a suitable port —119— and with an air passage —120— leading to the port —114—. It is now apparent that a partial vacuum is maintained in the governing pneumatic —115— which tends to move the valve —116— into position to close the port —119—, but by reason of the porosity of the valve —116— a small amount of air is capable of sifting through the porous valve even when closed, and therefore, this valve serves in a measure, to regulate the force of action of the motor-pneumatics, thereby determining the speed of the music-sheet and tempo of the selection. This tempo, however, is further regulated by means of a valve —92—, which is movable across the opening —113— and is connected by a link —121— to the tempo-lever —64—, previously mentioned—so that by rocking this lever in one direction or the other the passage —113— between the governing pneumatic —115— and passage —113— may be more or less restricted, thereby controlling the force of action of the motor-pneumatics and speed of the music-sheet when playing a musical selection. The port —114— is normally closed by a valve —125—, the action of which is controlled by a small pneumatic —126— in the valve-shelf —117—. The object of this port —114—, valve —125—, and its pneumatic —126— is to establish a more direct communication between the main exhausting device and motor pneumatics for operating the latter with full force and with increasing speed in the rewinding of the music-sheet from the roller —71— to the roller —70—. During this operation, it is desirable to cut off communication between the main exhausting device and key-action, and for this purpose I provide a valve-shelf —130— with two ports —131— and —132— which are normally covered by a valve —133—, but when uncovered, are open to atmosphere. One of these ports, as —131—, is connected by a flexible conduit —134— to the small pneumatic —126— while the other port —132— is connected by a conduit —135— to a pneumatic —136— in the upper portion of the chamber —10— of the exhaust chest —8—. It will be remembered that the upper end of this chamber —10— is connected by a conduit —15— to the exhaust-chamber —7— of the key-action, and therefore, the top of the case —8— is provided with a port —137— which leads into the conduit —15—. Resting upon the movable side of the pneumatic —136— is a valve —138— which is normally open, but is adapted to close the port —137— to cut off communication between the exhaust-chamber —10— and exhaust-chamber —7— of the key-action. It is now clear that by swinging the valve —133— to uncover both of the ports —131— and —132—, atmospheric air is admitted to the pneumatics —126— and —136— through their respective tubes —134— and —135—, thereby causing the inflation of said pneumatics to uncover the port —114— and to simultaneously close the port —137— by the valve —138—, see Figs. —4— and 7. This opening of the valve —125— establishes direct communication between the exhaust conduit —118— and exhaust-chamber —91—, thereby cutting out the governing pneumatic —115— and at the same time the key-action is cut off from communication with the main exhausting device by the closing of the valve —138—. The operation of the valve —133— to open the ports —131— and —132— to atmosphere is preferably accomplished simultaneously with the shifting of the clutch-section —78— into engagement with the clutch section —75— of the music-sheet driving mechanism for rewinding the music-sheet upon the roller —70—, and for this purpose I provide a hand-lever —140— within convenient reaching distance of the operator and connect this hand-lever by a link —141— and lever —142— to the clutch-section —78—, whereby when the lever —140— is moved in one direction the shaft —74— is moved endwise to disengage the pinion —73— from the gear —72— and at the same time to force the clutch —78— into driving connection with the sprocket-wheel —75—. The lever —140— is also connected by a link —144— to the free end of the swinging valve —133— so that when the lever —140— is rocked to throw the driving mechanism into connection with the rewinding roll —70— the ports —131— and —132— are simultaneously uncovered to admit atmospheric air to the pneumatics —126— and —136— for the purpose previously described.

It may be desirable, at times, to operate one or the other of the piano pedals to vary the expression, and for this purpose I provide a pedal-lever —150— which is secured to a rock-shaft —151— and is provided with a crank-arm —152— at the rear of the case —A—, said crank-arm being provided with a depending rod —152— to which is attached a pedal operating arm —153—, similar to what is shown in my pending application Serial No. 109,692, filed May 31, 1902.

In order that the operator may control the tempo and expression in accordance with the intention of the composer of the selection being played, the perforated music-sheet is provided with a tempo-line —c— and an expression line —c'— which lines are visible upon the surface of the music-sheet as it travels over the winding-roll —71—. A graduated plate or scale —d— is hinged at its lower edge to the support —45— and extends longitudinally across the front face of the music-sheet in front of the winding-roller —71— and its upper longitudinal edge bears lightly against the surface of the music-sheet either by gravity or by a suitable spring —e—. The plate —d— has two series of scales represented by vertical lines on the plate, Fig. 1, the lines for the tempo-scale being numbered to indicate various speeds of travel of the music-sheet and the upper end of the tempo-lever —64— is disposed in proximity to this scale and is movable transversely of its vertical lines so that as different parts of the tempo-line —c— on the music-sheet are registered with different vertical lines of the tempo-scale on the plate —d— the upper end of the tempo-lever —64— is brought into registration with such lines on the scale-plate —d— to operate the valve —120—, and thereby control the tempo or speed of the music-sheet. In like manner, the expression scale on the plate —d— is provided with a series of vertical lines of sufficient range to control the expression from *pp* to *ff*, and vice versa, as indicated by the expression line c'— on the music-sheet and the expression controlling lever —57— has its upper end movable in proximity to the scale-plate —d— to register with either of the vertical lines of the expression scale so that as different parts of the expression line —c'— register with different lines on the expression scale, the upper end of the lever —57— is correspondingly moved to register with such lines on the expression-scale, thereby operating the valve —52— to control the action of the small expression-controlling pneumatics —46— in the manner previously described.

I have previously described means controlled by the operator for accenting individual notes or chords, but in some instances I may prefer to control this accentuation automatically, in which case the tracker-bar —28— will be provided with an extra duct and the music-sheet will be formed with apertures at suitable intervals opposite to the note or chord which is to be accentuated and movable in registration with the extra duct in the tracker-board.

In Fig. 3 I have shown a duct —d— as leading from the extra accent-duct in the tracker-bar —28— to a suitable pneumatic —e— having a movable diaphragm —f— both of which are located in the lower part of an exhaust-chest or chamber —g—. This chamber is connected by conduits —h— to the exhaust-chamber —9— and communicates through a compartively small passage —i— with a second pneumatic —k— carrying a valve —m— which is movable in a valve-chamber —n—. This valve-chamber forms a part of the conduit —61— which connects the aperture —62— in the hand-lever —64— with the pneumatic —60— in the upper end of the chamber —9— so as to admit atmosphere to said pneumatic —60— for normally holding the valve —59— in position to close the port —11'—. The portion of the conduit —61— which enters the upper wall of the chamber —n— forms a valve-seat for the valve —m—. The valve-chamber —n— and its pneumatic —k— are of considerable less area than the area of the exhaust chamber —G— and pneumatic —e— to assure the instantaneous operation of the diaphragm —f— when atmospheric air is admitted through the duct —d— to the pneumatic —e— when the accenting perforation in the music-sheet is registered with its corresponding duct in the tracker-bar. It will be seen upon reference to Fig. 1, that the diaphragm —f— has a small bleeding hole —o—.

I have already described the means for manually controlling the operation of the valve —59— by closing the aperture —62— by the finger and I will now proceed to describe the operation of opening this valve —59— through the medium of the extra perforation in the music-sheet and the corresponding duct in the tracker-board.

As soon as the accenting perforation of the music-sheet is registered with its corresponding duct in the tracker-bar atmospheric air is admitted through the duct —d— into the pneumatic —e—, thereby elevating the diaphragm —f—, which in turn actuates the valve —m— upwardly against the overlying seat in the conduit —61—, thereby closing said conduit and producing the same effect upon the pneumatic —60 as though the aperture —62— were closed by the finger. As soon as the exact perforation in the music-sheet leaves its tracker-duct, which is then closed, the air is immediately exhausted from the pneumatic —e— through the bleed-hole —o— and is also exhausted from the pneumatic —k— through the passage —i—, thereby causing the diaphragms of said pneumatics, and also the valve —m— to drop to again open the passage through the conduit —61—.

It will be observed that in my pending application No. 221,995, filed August 24, 1904, the accentuation is controlled by opening either manually or automatically a port which is normally closed to atmosphere while in this case it is controlled by closing a port which is normally open to atmosphere.

The operation of my invention is as follows: The main exhausting device, as the bellows —1—, are actuated by the pedals —4— to maintain a partial vacuum in the equalizing chamber —3—, and also in the chamber —9—; main expression governing pneumatic —13—; chamber —10—, and exhaust-chamber —7— of the key-action and also in the tempo-governing pneumatic —115— and exhaust chamber —91— of the motor-pneumatic controlling mechanism. In the key-action it has been stated that a partial vacuum is maintained in the chamber —7—, and therefore, when a perforation in the music-sheet is registered with the vent —27— of the tracker —28— the atmospheric air enters and inflates the primary pneumatic —23— to operate the valve —24— and establish communication between the vacuum-chamber —7— and one of the key-striking pneumatics —20— in the manner previously described. The force of action of these key-striking pneumatics, or expression is controlled by means of the lever —57— and valve —52—. The accentuation of any individual note or chord is controlled by closing the duct —61— against atmosphere, which in this instance, normally communicates with atmosphere through an opening in the hand-piece of the tempo-lever —64—, as best seen in Fig. 3, whereby the valve —59— is caused to uncover the port —58— to establish direct communication between the main exhaust device and key-action.

In rewinding the music-sheet the lever —140— is operated in the manner previously described to disconnect the driving-shafts —13— from the roller —71—, and at the same time to connect it to the rewinding roller —70—. During this operation the valve —133— is operated to uncover the ports —131— and —132—, thereby admitting atmospheric air to the pneumatic —126—, Fig. 7, and also to the pneumatic —136—, Fig. 3, to close the port —137—, thereby establishing direct communication between the main exhaust device and vacuum-chamber —91— of the motor-pneumatics, and at the same time, cutting communication between the main exhaust device and chamber —7— of the key-action. This throws the full force of the exhausting device into the motor-pneumatics, thereby increasing the speed of action on the rewind of the music-sheet.

Reference is hereby made to applicant's pending applications Nos. 329,692 filed August 8, 1906, reissue application 594,228 filed November 25, 1910, 464,988 filed November 28, 1908, and 780,350 filed January 21, 1913.

Having thus fully described my invention, what I claim and desire to secure by Letters Patent, is—

1. In a self-playing musical instrument, striker pneumatics, a valve chest flexibly connected to said pneumatics, a plurality of groups of valves and corresponding groups of primary pneumatics within the valve chest, said valve chest having an exhaust chamber common to all of the valves and primary pneumatics, means including a perforated music sheet for controlling the action of the primary pneumatics, and an exhaust device connected to the valve chest.

2. In a self-playing musical instrument, striker pneumatics, a valve chest flexibly connected to said pneumatics, a plurality of groups of valves and corresponding groups of primary pneumatics within the valve chest, said valve chest having an exhaust chamber common to all of the valves and primary pneumatics, means including a perforated music-sheet for controlling the action of the primary pneumatics, an exhaust device connected to the valve chest, and an expression governing pneumatic connected to and between the exhaust device and valve chest.

3. In a self-playing musical instrument, striker pneumatics, a chest flexibly connected to said pneumatics, a plurality of groups of valves and corresponding groups of primary pneumatics within the valve chest, said valve chest having an exhaust chamber common to all of the valves and primary pneumatics, means including a perforated music sheet for controlling the action of the primary pneumatics, an exhaust device connected to the valve chest, a valve in the connection between the exhaust device and valve chest, a pneumatic controlling the action of said valve and having a vent to atmosphere, and manually controlled means for closing said vent.

4. In a self-playing musical instrument, striker pneumatics, a valve chest flexibly connected to said pneumatics, a plurality of groups of valves and corresponding groups of primary pneumatics within the valve chest, said valve chest having an exhaust chamber common to all of the valves and primary pneumatics, means including a perforated music sheet for controlling the action of the primary pneumatics, an exhaust device connected to the valve chest, an expression governing pneumatic connected to and between the exhaust device and valve chest, and means separate from the expression pneumatic for controlling direct communication between the exhaust device and valve chest.

5. In a self-playing musical instrument, striker pneumatics, a valve chest flexibly connected to said pneumatics, a plurality of groups of valves and corresponding groups of primary pneumatics within the valve chest, said valve chest having an exhaust chamber common to all of the valves and primary pneumatics, means including a perforated music sheet for controlling the action of the primary pneumatics, an exhaust device connected to the valve chest, direct and indirect connections between the exhaust device and valve chest, an expression pneumatic forming a part of the indirect connection, a valve in the direct connection, a pneumatic for actuating said valve and having a vent opening to atmosphere, and means for closing said vent at will.

6. In a self-playing musical instrument, striker pneumatics, a valve chest flexibly connected to said pneumatics, a plurality of groups of valves and corresponding groups of primary pneumatics within the valve chest, said valve chest having an exhaust chamber common to all of the valves and primary pneumatics, means including a perforated music-sheet for controlling the action of the primary pneumatics, an exhaust device connected to the valve chest, a rewinding mechanism for the music sheet, a pneumatic motor for actuating said mechanism, means for connecting and disconnecting said mechanism to and from the motor, and additional means for cutting off communication between the exhaust device and valve chest when the rewinding mechanism is connected to the motor.

7. In a self-playing musical instrument, striker pneumatics, a valve-chest flexibly connected to said pneumatics, a plurality of groups of valves and corresponding groups of primary pneumatics within the valve chest, said valve chest having an exhaust chamber common to all of the valves and primary pneumatics, means including a perforated music-sheet for controlling the action of the primary pneumatics, an exhaust device connected to the valve chest, an expression governing pneumatic connected to and between the exhaust device and valve chest, a valve in the connection between the expression pneumatic and valve chest, a separate pneumatic controlling the action of said valve and having a vent to atmosphere, and means for opening and closing said vent.

8. In a self-playing musical instrument, a series of striker pneumatics, a music sheet, a tracker bar, an air exhaust device, a valve chest having a vacuum chamber connected to the exhaust device, primary pneumatics connected to the tracker bar, valves operated by the primary pneumatics for connecting the vacuum chamber to the striker pneumatics, direct connections between the exhaust device and vacuum chamber including therein a pneumatic regulator, a series of resistance pneumatics connected to the pneumatic regulator, an exhaust port communicating with the exhaust device, atmosphere ports each communicating with one of the resistance pneumatics, and means under the control of the operator for connecting one or more of the atmosphere ports with the exhaust port.

9. In a self playing musical instrument, a pneumatic action having a wind chest, an exhaust device, a valve-chest connected directly to and between the exhaust device and wind chest, an accent valve and operating pneumatic therefor both located in the valve chest and controlling direct communication between the exhaust device and wind chest, and an expression governing pneumatic connected to the valve chest at opposite sides of the accent valve.

10. In a self-playing musical instrument, an exhaust device, a pneumatic action having a wind chest, a direct connection between the exhaust device and wind chest, an accent valve in said connection, manually controlled pneumatic means controlling the operation of said valve, and a by-pass around the valve comprising an expression governing pneumatic, a normally open shut-off valve in the connection between the by-pass and wind-chest, and means for closing said shut-off valve.

11. In a self-playing musical instrument, an exhaust device, a pneumatic action having a wind chest, a direct connection between the exhaust device and wind chest, an accent valve in said connection, manually controlled pneumatic means controlling the operation of said valve, a by-pass around the valve comprising an expression governing pneumatic, a normally open shut-off valve in the connection between the by-pass and wind-chest, and manually controlled pneumatic means for closing said valve.

12. In a self-playing musical instrument, a pneumatic sound producing action and an air exhaust device, an air chest connected to and between the air exhaust device and action, a cut-off valve in said air chest, a separate accent valve also in the air chest, separate pneumatics located within the air chest for controlling said valves, and separate devices for controlling the action of said pneumatics.

13. In a self-playing musical instrument, a pneumatic sound producing action, an air exhaust device, an air chest connected to and between the exhaust device and action, a partition in the air chest having a port therein, an accent valve for said port, a pneumatic within the air-chest controlling the action of said valve and having a vent to atmosphere, and means for closing said vent.

14. In a self-playing musical instrument, the combination of a perforated music sheet and tracker bar, a valve chest below the tracker bar, separate groups of valves and their primary pneumatics within the valve chest, said valve chest having an exhaust chamber common to all the valves, striker pneumatics between the tracker bar and valve chest and overhanging the key-board of the piano, separate flexible conduits, one for each valve, leading from the valve chest to the striker pneumatics, separate conduits leading from the primary pneumatics to the tracker bar, an air exhaust device, an air chest having a normally open valved-port leading to the exhaust chamber of the valve chest, said air chest also having a normally closed valved-port leading to the air-exhausting device, separate valves for said ports, separate means controlled by the operator for causing said valves to open and close their respective ports, and an expression governing pneumatic communicating with the air exhausting device and with the normally open port.

15. In a self-playing musical instrument, a pneumatic sound producing action, in combination with an air exhaust device, an air chest connected to and between the exhaust device and action, a cut-off valve and actuating pneumatic therefor within said air chest, said valve actuating pneumatic having a normally closed vent to atmosphere and a valve for said vent.

16. In a self-playing musical instrument, a sound producing action and an air exhaust device, an air chest connected to and between the exhaust device and action, a cut-off valve within said air chest for opening and closing communication between the exhaust device and sound producing action, an actuating pneumatic for said valve located within and communicating through a bleed hole with the interior of said air chest, and manually controlled means for placing said pneumatic in communication with the atmosphere to close the valve.

17. In a self-playing musical instrument, a pneumatic sound producing action and an exhaust device, an air chest connected to and between the exhaust device and action and provided with a pair of ports in one side, a partition dividing the interior of the air chest between said ports and provided with an air passage connecting the compartments at opposite sides of the partition, an expression governing pneumatic covering said ports and forming a by-pass for the air around the partition, an accenting valve for the passage in the partition and an actuating pneumatic therefor.

18. In a self-playing musical instrument, a pneumatic sound producing action and an air exhaust device, an air chest connected to and between the exhaust device and action, an accenting valve and its actuating pneumatic both within the air chest, said pneumatic communicating through a bleed hole with the interior of the air chest, and means for normally admitting air to the valve actuating pneumatic.

19. In a self-playing musical instrument, a sound producing action and an air exhaust device, an air chest connected to and between the exhaust device and said action, and provided with a pair of ports, and a transverse partition between the ports dividing the interior of the air chest into opposite compartments, said partition having an air passage therethrough connecting said compartments, an expression governing pneumatic connecting said ports outside of the air chest, an accent valve and actuating pneumatic therefor located within the air chest and normally closing said air passage, said pneumatic normally communicating with the atmosphere and having a comparatively small bleed hole opening into the interior of the air chest, and means for closing communication between said accenting pneumatic and atmosphere, whereby the pneumatic is deflated to open the valve.

20. In a self-playing musical instrument, a sound producing action, an exhaust device, a conduit connected directly to and between the exhaust device and action, an accent valve and controlling pneumatic therefor located in the conduit, a hollow movable conduit connected to the pneumatic and adapted to be opened and closed to the atmosphere for effecting the inflation and deflation of the pneumatic and thereby controlling the action of the accent valve, said pneumatic having a bleed hole communicating with the interior of the conduit.

21. In a self-playing musical instrument, a sound producing action, an exhaust device, connections between the exhaust device and sound producing action, a valve in said connections controlling communication between the exhaust device and sound producing action, a pneumatic controlling the action of said valve, and a movable air conduit connected to the pneumatic and adapted to be opened and closed to atmosphere.

22. In a self-playing musical instrument, a pneumatic action, an exhaust device connected to said action, a valve controlling said action, a pneumatic controlling the valve, a movable air conduit connected to the valve controlling pneumatic and adapted to be opened and closed to atmosphere for controlling the inflation and deflation of the pneumatic and thereby controlling the operation of the valve.

23. In a self-playing musical instrument, a pneumatic action, an exhaust device connected to said action, a valve controlling said action, a pneumatic controlling the valve, a movable air conduit connected to the valve controlling pneumatic and adapted to be opened and closed to atmosphere for controlling the inflation and deflation of the pneumatic and thereby controlling the operation of the valve, said valve controlling pneumatic having a bleed hole communicating with the exhaust device.

24. In a self-playing musical instrument, an exhaust device, a valve chest connected directly to and between the exhaust device and action, an accent valve and controlling pneumatic therefor in the valve chest, the valve controlling pneumatic having a bleed hole communicating with the interior of the valve chest, and a movable conduit connected to the valve controlling pneumatic and adapted to be opened and closed to atmosphere for causing the inflation and deflation of said valve controlling pneumatic and thereby controlling the action of the valve.

25. In a self-playing musical instrument, an exhaust device, a valve chest connected directly to and between the exhaust device and action, an accent valve and controlling pneumatic therefor in the valve chest, the valve controlling pneumatic having a bleed hole communicating with the interior of the valve chest, and a movable conduit connected to the valve controlling pneumatic and adapted to be opened and closed to atmosphere for causing the inflation and deflation of said valve controlling pneumatic and thereby controlling the action of the valve, a shut-off valve in the valve chest, a primary pneumatic controlling the shut-off valve, and a conduit connected to the pneumatic for the shut-off valve and adapted to be opened and closed to atmosphere.

26. In a self-playing musical instrument, an exhaust device and a valve chest having a sound producing action, a direct windway connecting the exhaust device to said valve chest, an accenting pneumatic normally closing the passage of air through said windway and having a vent to atmosphere adapted to be closed by the finger and an expression governing pneumatic communicating with the direct passage.

27. In a self-playing musical instrument, an exhaust device and a sound producing action, a conduit connecting the exhaust device with said action and provided with a transverse partition having a port therethrough, said conduit having additional ports at opposite sides of the partition, an expression governing pneumatic connecting said additional ports, an accenting pneumatic controlling the passage of air through the first named port, and means for controlling the action of said accenting pneumatic.

28. In a self-playing musical instrument, an exhaust device and a sound producing action, a conduit connecting said device with said action and provided with a transverse partition having a port therethrough, said conduit being also provided with additional ports at opposite sides of the partition, an expression governing pneumatic connecting said additional ports, a valve normally closing the first named port, an additional pneumatic normally communicating with atmosphere to hold said valve closed, said additional pneumatic having communication with the exhaust device, and means for closing communication between said additional pneumatic and atmosphere, whereby said pneumatic is deflated to open the valve.

29. In a self-playing musical instrument, an expression controlling mechanism, a tempo controlling mechanism, a lever controlling the action of one of said mechanisms, an accenting pneumatic having an air vent to atmosphere terminating in said lever and opened and closed manually to control the operation of the accenting pneumatic.

30. In a pneumatic self-playing musical instrument, a sound producing action, an exhaust device, a direct connection between the exhaust device and sound producing action, a valve and operating pneumatic therefor controlling the direct passage of air through said connection, a lever connected to and actuating one of the parts of the instrument and having an opening to atmosphere adapted to be opened and closed at the will of the operator, and a conduit connecting the opening in said lever with said pneumatic.

31. In a self-playing musical instrument, an air-exhausting device and a pneumatic sound producing action connected thereto, an accenting valve, an actuating pneumatic therefor in the connection between the exhaust device and said action, and a cut-off valve and its actuating pneumatic also in said connection between the accent valve and pneumatic sound producing action.

32. In a self-playing musical instrument, an air exhausting device and a pneumatic sound producing action connected thereto, an accenting valve in the connection between the exhaust device and action, and a pneumatic actuating device for said valve, and an expression pneumatic communicating with said connection at opposite sides of the accent valve.

33. In a pneumatic self-playing musical instrument, a sound producing action, an exhaust device, a conduit connected directly to and between the exhaust device and action, separate valves and separate actuating pneumatics all within said conduit and controlling the passage of air through said conduit, and separate devices for controlling the action of said pneumatics.

34. In a pneumatic self-playing musical instrument, an exhaust device, a pneumatic sound producing action, a conduit connected directly to and between the exhaust device and action, a pneumatic regulator communicating with the conduit, resistance pneumatics connected to the movable side of the pneumatic regulator, and means for placing one or more of said resistance pneumatics alternately in connection with the atmosphere and with the exhaust device.

35. In a self-playing musical instrument, an exhaust device and sound producing action, direct connections between said device and action, an accenting device including a pneumatic in said connection and normally communicating with the atmosphere, and means for cutting off such communication at will.

36. In a self-playing musical instrument, a sound producing action, an exhaust device, a conduit connected directly to and between the exhaust device and action, a valve and its operating pnuematic in said conduit controlling communication between the exhaust device and action, means controlling the action of the pneumatic, and an expression governing pneumatic communicating with said action at opposite sides of the valve and its operating pneumatic.

37. In a pneumatic self-playing musical instrument, an air exhaust device and a valve-chest connected thereto, a manual connected to one of the parts of the instrument and containing an aperture open to atmosphere, a valve in the connection between the exhaust device and valve chamber, and a pneumatic connected to said aperture whereby the valve is held closed by atmospheric pressure, said aperture being closed by the hand of the operator to allow the valve to open.

In witness whereof I have hereunto set my hand this 4th day of February 1905.

LEWIS B. DOMAN.

Witnesses:
  Mrs. THOMAS ELLIOTT,
  NETTIE A. BIBBIUS.

---

Copies of this patent may be obtained for five cents each, by addressing the "Commissioner of Patents, Washington, D. C."